United States Patent [19]

Fandrich et al.

[11] 4,422,284

[45] Dec. 27, 1983

[54] APPARATUS AND METHOD FOR HARVESTING SEED BEARING CONES

[75] Inventors: Helmut E. Fandrich, 2461 Sunnyside Pl., Clearbrook, British Columbia, Canada, V2T 4C4; Fred Fandrich, Agassiz, Canada

[73] Assignee: Helmut Edward Fandrich, Clearbrook, Canada

[21] Appl. No.: 139,577

[22] Filed: Apr. 11, 1980

[51] Int. Cl.³ .............................................. A01D 46/00
[52] U.S. Cl. .................................................. 56/328 R
[58] Field of Search ...................... 56/328 R, 329, 330, 56/63, 126, 130, DIG. 2

[56] References Cited

U.S. PATENT DOCUMENTS

| | | | |
|---|---|---|---|
| 1,138,952 | 5/1915 | Hewitt | 56/34 |
| 2,700,269 | 1/1955 | Lowe | 56/329 |
| 3,439,481 | 4/1969 | Hall | 56/328 R |
| 3,681,900 | 8/1972 | Blevins | 56/63 |
| 3,877,208 | 4/1975 | Wesemann | 56/328 R |

FOREIGN PATENT DOCUMENTS 320266 2/1972 U.S.S.R. .................... 56/328 R

OTHER PUBLICATIONS

Dobbs, R. C. et al., "Development and Evaluation of an Aerial Cone Rake," 9/1977.

*Primary Examiner*—Jay N. Eskovitz
*Attorney, Agent, or Firm*—Carver & Co.

[57] ABSTRACT

Apparatus and method for harvesting seed bearing cones from a tree, the apparatus having a retrieving structure and holding structure to define a collecting enclosure therebetween to receive cone bearing material with structure to unload the collecting enclosure. The apparatus has a guide to encircle the tree to ensure generally axial movement, and separating structure adjacent an upper portion thereof which separates cone containing material from the tree resulting from upwards movement of the apparatus. In one embodiment the separating structure has a plurality of recesses to receive the tree trunk, the recesses being provided with knives which cut the branches when the trunk enters the recess and the device is moved upwardly up the trunk. Alternatively, the separating structure has recesses to receive branches and is provided with rake means to rake the cones from the branches. The method includes lowering of the apparatus generally axially down the tree and shifting the apparatus generally laterally to engage a portion of the tree within one of the recesses. Apparatus is moved axially upwardly so that edges of the recesses remove cone containing material from the tree.

19 Claims, 17 Drawing Figures

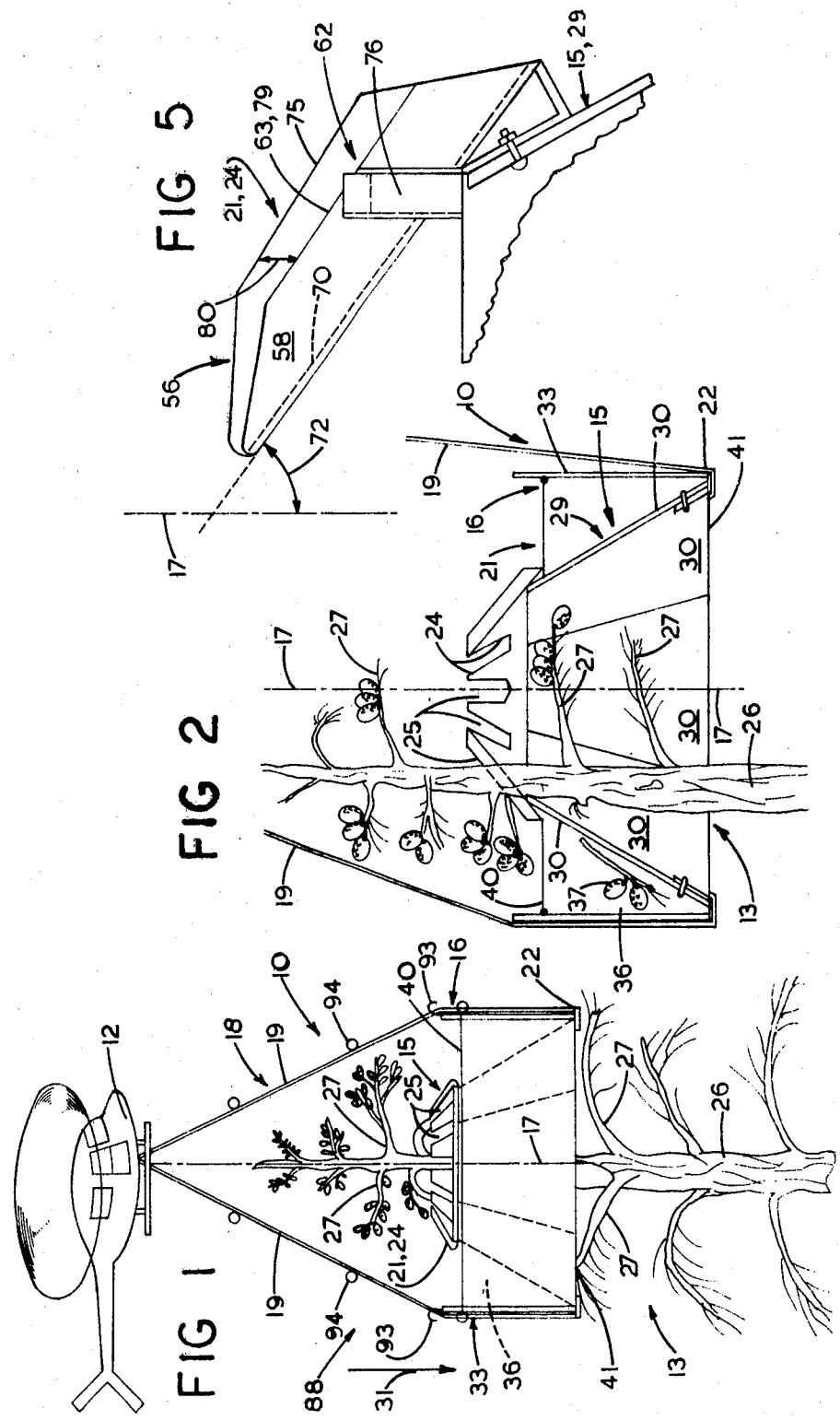

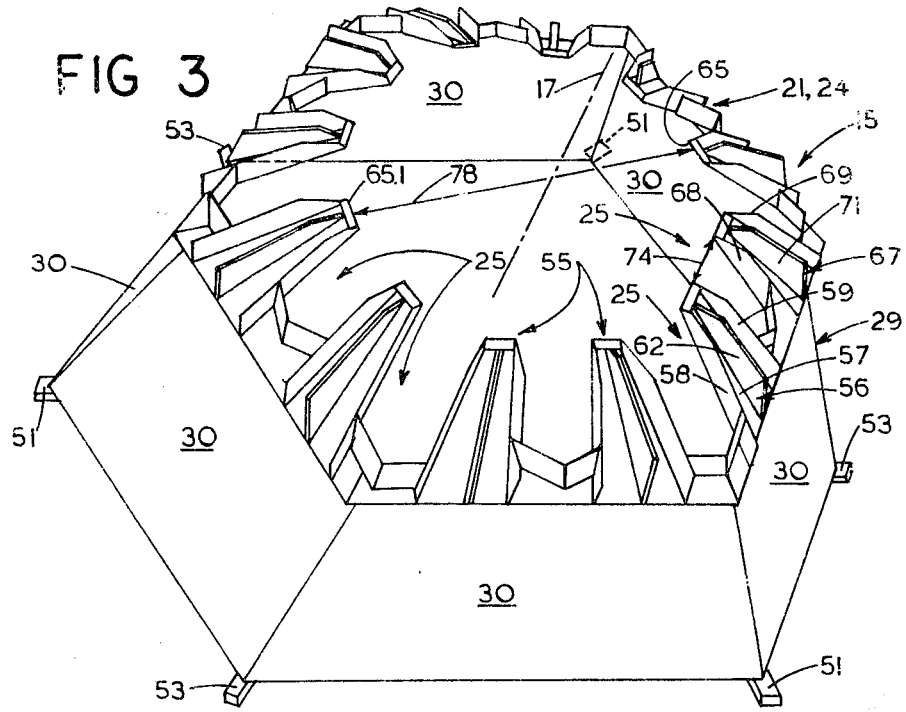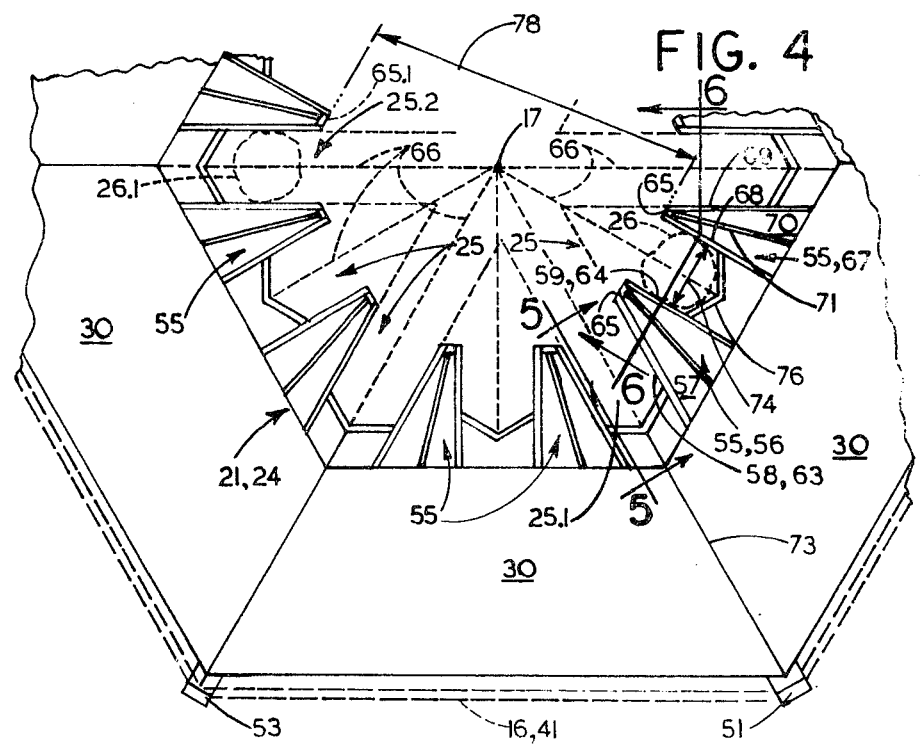

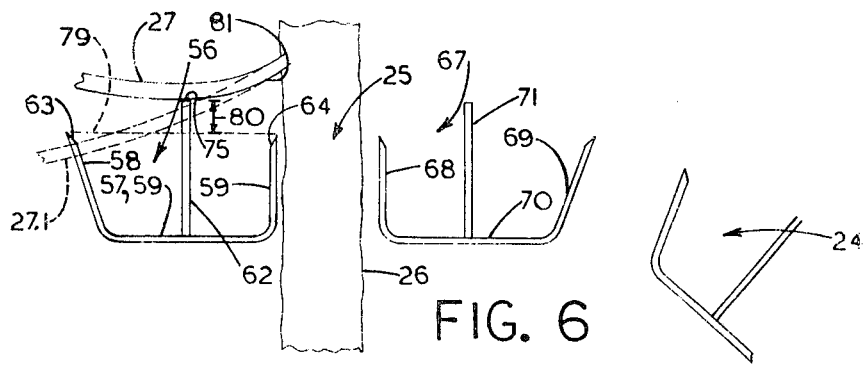
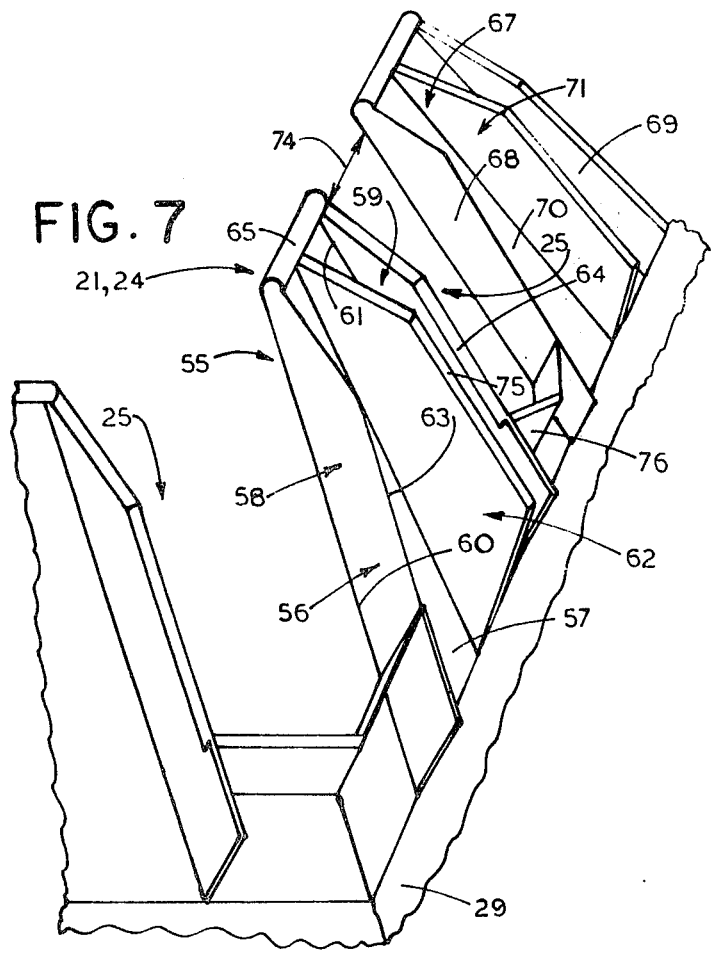

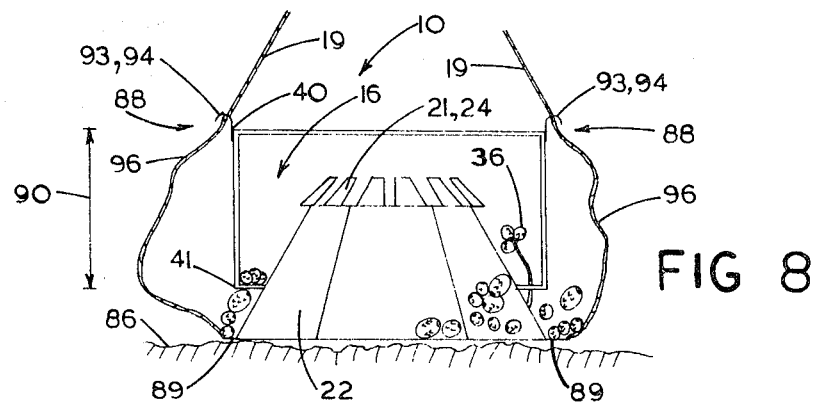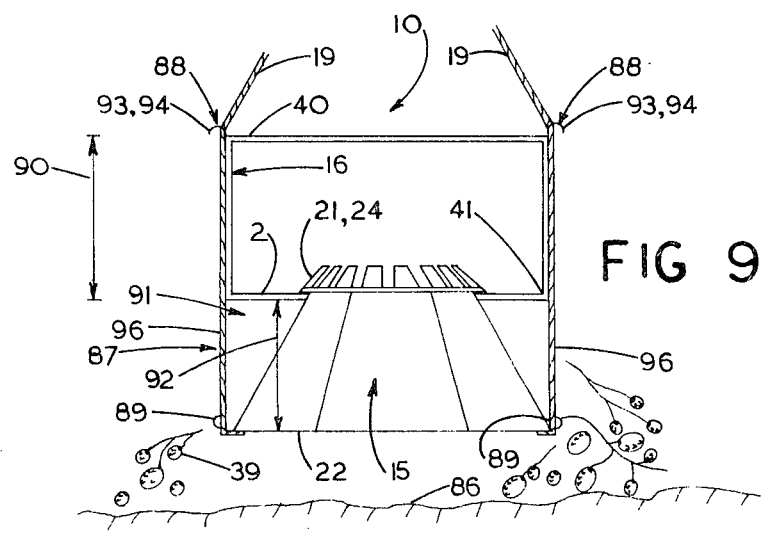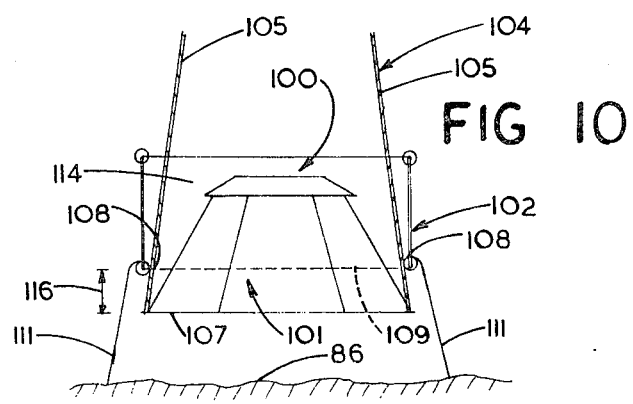

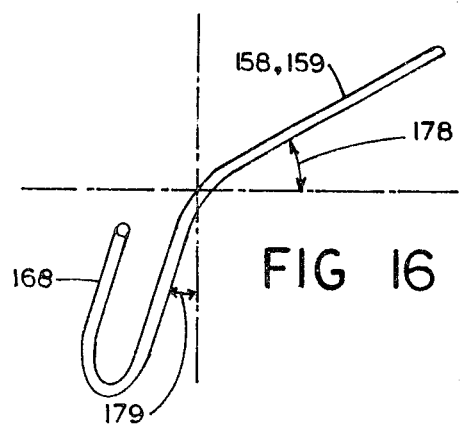
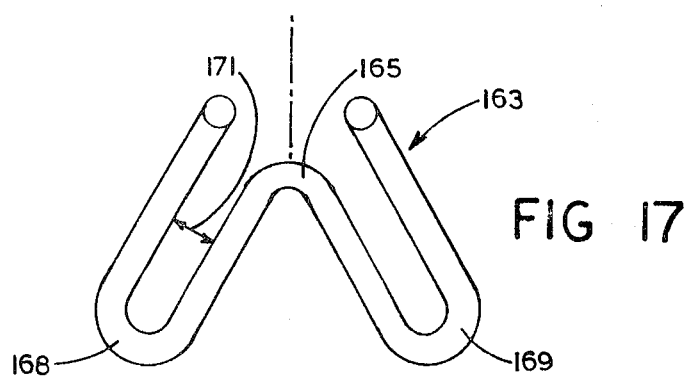

APPARATUS AND METHOD FOR HARVESTING SEED BEARING CONES

BACKGROUND OF THE INVENTION

1. Field of the Invention

The invention relates to an apparatus for harvesting seed bearing cones from coniferous trees for the purpose of growing seedlings for re-forestation and other commerical purposes.

2. Prior Art

Manual methods of collecting cones have been used for many years and commonly these resulted in severe damage to, or total loss of, the tree. Seed bearing cones tend to grow adjacent the upper portion of the tree, and in the past the tree was felled to enable collection of the cones, or at least topped so that the top of the tree fell to the ground to enable the cones to be collected manually therefrom.

Apparatus for retrieving cones from trees using cone collecting apparatus suspended from helicopters have been tried recently but, to the inventor's knowledge, have not been particularly successful. Flying helicopters at low levels over forests involves high risks to the pilot and helicopter, which risks are further compounded by flying in mountainous terrain where air currents are notoriously unpredictable. Some cone collecting apparatus require that the helicopter approaches the tree in a particular direction, which involves skillful flying and further limits use of the apparatus to certain wind conditions. Other apparatus are lowered vertically down the tree and have devices adapted to engage the tree when the apparatus is pulled upwardly. These devices tend to grab onto the tree, and sometimes jam on the tree which requires the helicopter pilot to jetison the apparatus to reduce risk to himself and the helicopter. Other apparatus also enclose the tree, but use fixed radially outwardly extending rakes or knives adapted to cut branches or pull cones from the trees.

When successful, these apparatus permit branches containing cones, or cones with a small amount of foliage, to be stripped from the tree, and collected in a holding portion of the apparatus. The helicopter then flies to an unloading station where the cones or branches containing the cones are unloaded by an operator on the ground. The unloading commonly involves the helicopter hovering over the ground and suspending the apparatus therefrom whilst it is being unloaded, or alternatively the helicopter must land for the time required for manually unloading. Because unloading might take perhaps between 5 and 15 minutes to release jammed branches and cones, "turn-around" time of the helicopter between trips to the trees is relatively long and thus considerably increases the cost of the operation in view of the high cost of operating helicopters.

SUMMARY OF THE INVENTION

The invention reduces difficulties and disadvantages of the prior art by providing a seed cone harvesting apparatus which permits the helicopter pilot to approach the trees from a direction of his choice, or as determined by wind and terrain. When the tree is engaged by the apparatus, branches and/or cones are removed from the trees by moving the apparatus generally axially up the tree to separate the cones or cone bearing branches from the tree to collect into a holding means. In one embodiment, the holding means can be released automatically by the pilot without requiring manual assistance on the ground, thus reducing work for operators on the ground and reducing turn-around time between trips to the trees.

An apparatus according to the invention has a retrieving means, a holding means and an unloading means. The retrieving means has an upper portion having separating means to separate the cone containing material from the tree resulting from relative movement between the retrieving means and the tree. The retrieving means has a guide means adapted to encircle the tree and to permit generally axial movement of the retrieving means relative to trunk of the tree. The holding means cooperates with the retrieving means to provide a collector to collect the cone containing material from the tree. The unloading means cooperates with the holding means and the retrieving means to permit relative axial movement therebetween to produce a clearance between the holding means and the retrieving means to permit the cone containing material to fall from the apparatus when desired.

In one embodiment of the apparatus, the upper portion of the retrieving means has an upper periphery having a plurality of recesses to receive the tree trunk, the recesses being provided with the knives to separate the cone containing material from the tree upon generally axial movement of the retrieving means along the trunk. Each recess is defined by a pair of generally parallel straight side edges provided with generally upwardly extending knives, the side edges being spaced apart at a knife spacing to accept maximum thickness of the tree trunk at a lowermost position of the apparatus on the trunk. In another embodiment, the upper periphery has recesses to receive branches, edges of the recesses raking cones off the branches to serve as rakes. Use of the rake is determined by the size of the cone relative to the branch on which it grows. Each recess has rake means, and each rake means has an opening therin facing inwardly to accept a branch passing laterally therethrough. A remaining portion of the rake means has opposed edge portions spaced apart from each other to accept the branch therebetween, and yet spaced sufficiently closely from each other to trap a cone therebetween when the rake means is pulled generally along the branch. The rake means also has a closed end portion disposed radially outwardly from the opening, and having an area greater than area adjacent the opening to provide space into which the branches can expand. In these two embodiments, structure defining the recesses is stationary so as to be non-rotationally mounted relative to the lower portion and to a central longitudinal axis of the apparatus. Cones are separated from the tree upon generally axial movement of the retrieving means along the trunk with negligible rotational movement of the separating means.

A method according to the invention is for harvesting cones from a tree using a cone harvesting apparatus having a retrieving means. The retrieving means has separating means with generally inwardly facing recesses to receive a portion of the tree enclosed by the retrieving means. The method is characterized by lowering the harvesting apparatus generally axially down the tree and shifting the apparatus generally laterally to engage a portion of the tree with one of the recesses. The apparatus is then moved generally axially upwardly to cause relative movement between the portion of the tree and the apparatus so that edges of the recess engage portions of the tree to remove cones therefrom.

In one apparatus the recesses have upwardly facing knives and as the apparatus moves generally upwardly along the trunk the knives of the recesses cut the branches off the trees, thus removing cone containing material. In another embodiment, the recesses have rake means which have a closed end portion having a width greater than width of an inner portion of the recess. The method is characterized by permitting sub-branches extending from the branch to expand into the recess to reduce excessive forces from the sub-branches as the apparatus moves up the tree. Thus, the cones are pulled off the branches and sub-branches by raking with edges of the recess.

A detailed disclosure following, related to drawings, describes apparatus and method according to the invention, which are capable of expression in apparatus and method other than that particularly described and illustrated.

DESCRIPTION OF THE DRAWINGS

FIG. 1 is a simplified side elevation of a helicopter supporting an apparatus according to the invention, the apparatus being fitted axially over a tree, FIG. 2 is a simplified fragmented section through the apparatus showing engagement with the tree, FIG. 3 is a simplified fragmentted perspective of a retrieving portion of the invention showing the first example of the separating means, FIG. 4 is a simplified fragmented top plan of a portion of the apparatus as shown in FIG. 3, position of a portion of the holding means also being shown, FIG. 5 is a simplified fragmented section on line 5—5 of FIG. 4, at enlarged scale, some portions being omitted for clarity, FIG. 6 is a simplified fragmented section on line 6—6 of FIG. 4, at enlarged scale, some portions also removed for clarity, FIG. 7 is a simplified fragmented perspective of a portion of the separating means according to the invention, FIG. 8 is a simplified diagrammatic side elevation of the apparatus during an initial stage of unloading, FIG. 9 is a simplified diagrammatic side elevation of the apparatus during a final stage of unloading, FIG. 10 is a simplified diagrammatic side elevation of an alternative form of unloading means during unloading, FIG. 16 is a simplified section on line 16—16 of FIG. 14, and FIG. 17 is a simplified section on line 17—17 of FIG. 14.

DETAILED DISCLOSURE

FIGS. 1 and 2

Figure 11:
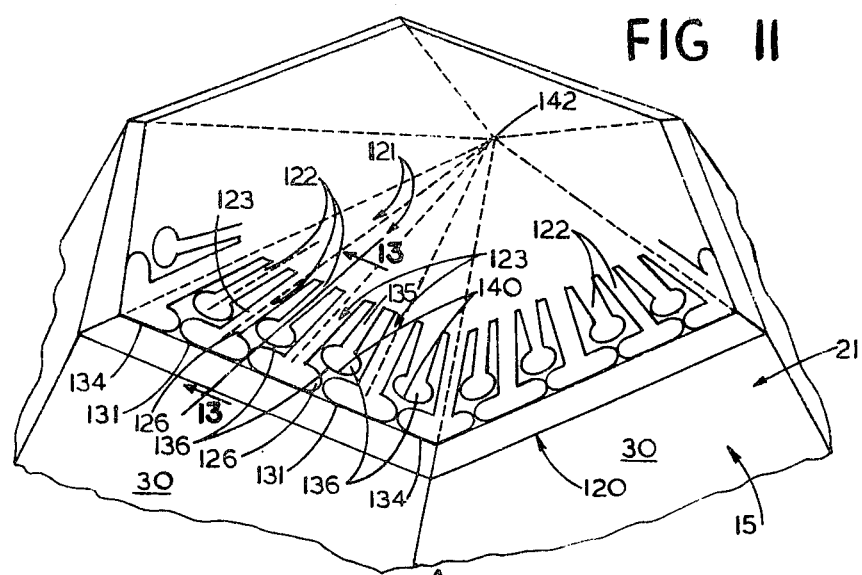
FIG. 11 is a simplified fragmented perspective of a portion of an alternative separating means using rakes.

An apparatus 10 according to the invention is shown supported by a helicopter 12 above a cone bearing or coniferous tree 13. The apparatus is shown embracing an upper portion of the tree where usually most seed cones are found. The apparatus includes a retrieving means 15, a holding means 16 and a harness 18, all disposed symmetrically about a central axis 17, the harness extending from the helicopter to cooperate with the apparatus 10, as will be described. The harness has preferably three flexible cables 19 disposed symmetrically about the axis 17, two only being shown spaced at 180°, for simplicity, instead of three at 120°. The helicopter has means, not shown, to permit rapid release of the harness so as to jetison the apparatus should an emergency arise, such as entanglement of the apparatus in a tree, or a change in the weather necessitating abandonment of the operation.

The retrieving means 15 has upper and lower portions 21 and 22, the upper portion having a periphery provided with a plurality of recesses 25 having separating means 24 which are described in more detail with reference to FIGS. 3 through 7. The tree 13 has a trunk 26 and branches 27 bearing needles and seed cones. The recesses 25 accept the trunk so that the separating means cooperate with the branches to separate cone containing material, eg. branches bearing the cones, or the cones themselves, from the tree resulting from relative movement between the retrieving means and the tree.

The retrieving means has a hollow tapered body 29 having a plurality of plane faces or facets 30. In this example, six faces are shown extending upwardly from a regular hexagonal open base so as to define a hollow tapered body with an outwardly and downwardly diverging side wall extending from the upper portion 21 to the lower portion 22. The lower portion of the retrieving means is considerably larger than the upper portion, as in a hollow truncated pyramid or cone, and facilitates acceptance of the upper branches of the tree into the retrieving means. The tapered shape facilitates approximately symmetrical lowering of the retrieving means over the tree, as shown in direction of an arrow 31 in FIG. 1. It can be seen that the hollow body is adapted to encircle the tree to permit generally axial movement of the retrieving means relative to the trunk, thus serving as a guide means.

The holding means 16 has a hollow body 33 extending peripherally around the lower portion 22 or base of the tapered body of the retrieving means so as to define an enclosure or collector 36 spaced around the retrieving means 15 to hold cone containing material 37 which has been separated from the tree. The hollow body of the holding means has six facets or faces similarly arranged as a regular hexagon in section and disposed in planes with parallel intersecting adjacent margins, the regular hexagon being generally complementary to the lower portion or base of the retrieving means. The hollow body 33 has open upper and lower portions 40 and 41 and thus is a hollow, open-ended, regular hexagonal sectioned tube, and is of relatively lightweight construction as it serves merely as an outer wall of the enclosure 36. The lower portion 41 is adapted to enclose closely the lower portion 22 of the retrieving means so as to form an effective seal therewith to prevent loss of the cone containing material 37 held within the enclosure 36.

To separate cone bearing material from the tree, after the apparatus has been lowered part-way down the tree as seen in FIG. 1, the device is then displaced laterally so that the trunk is accepted in a particular selected recess 25, as seen in FIG. 2. The apparatus is then drawn upwardly with a force disposed obliquely to the axis of the device, and of such magnitude that the cables 19 assume an assymmetrical disposition relative to the axis 17 which tends to maintain the trunk in the selected recess 25. Upper edges of the separating means are inclined to assist in maintaining the trunk in the recess.

FIGS. 3 through 7

The six similar generally plane facets 30 of the retrieving means 15 are joined together at adjacent edges to form the truncated pyramidal shape, as best seen in FIG. 3. Three main brackets 51 extend from three corners as shown and are spaced 120° apart about the longitudinal central axis 17 to carry lower ends of the cables 19, not shown. Smaller intermediate brackets 53 extend outwardly from the remaining three corners, so as to be spaced at 120° apart from each other, and 60° from the main brackets 51. The two sets of three brackets 51 and 53 support the lower portion 41 of the holding means 16, as shown in broken outline in FIG. 4 only.

The upper portion 21 of the retrieving means carries the separating means 24 which is preferably a truncated steel structure which is sufficiently rigid to withstand the stresses of separating the cone bearing material from the tree and is still sufficiently light not to detract appreciably from the helicopter payload. In constrast, the hollow body 29 of the retrieving means is a relatively weaker and lighter structure, and is suitably sheet fiberglass or aluminum on a lightweight stiffening frame. The body 29 serves as an inner wall of the enclosure 36, and simultaneously as the guide means to guide the device over the foliage and branches of the tree.

As best seen in FIG. 4, the plurality of recesses 25 of the separating means 24 are disposed radially of the apparatus and are defined by a plurality of generally similar radially disposed knife members 55. Edges of the knife members of a particulr recess 25 are parallel to each other and are also parallel to a radial axis 66 of the recess. Thus each edge of a knife member is disposed slightly obliquely to a respective local radius adjacent that edge, which obliquity is termed "generally radially" of the apparatus.

As seen in detail in FIG. 7, a particular knife member 56 has a generally flat web portion 57 with a pair of lateral knife portions 58 and 59 extending upwardly from inclined side margins 60 and 61 of the web portion to define edges of adjacent recesses. The knife portions 58 and 59 have respective similar knife edges 63 and 64 along upper edges thereof which edges are best seen in FIG. 6. A branch bender 62 is disposed symmetrically between the knife portions 58 and 59 and will be described in detail later. The knife member 56 has an inner end portion 65 which has a reinforced partially cylindrical end to protect the web portion 57 and to facilitate sliding of the knife member along the trunk or branches with little tendency to grab.

As seen in FIGS. 3, 4 and 7, two knife members extend from each facet 30 of the body 29, and are mirror images of each other disposed symmetrically about a radial plane containing the axis 66 of the particular recess 25 defined by the two knife members. It can be seen that the knife member 56 is a left hand knife member, and a knife member 67, which is disposed on an opposite side of the axis 66 of the recess 25 is a right hand knife member. The member 66 has lateral knife portions 68 and 69 extending upwardly from side margins of a similar web portion 70, and a symmetrically disposed branch bender 71. Thus the recess 25 is defined by a pair of oppositely disposed knife portions 59 and 68 of the two adjacent knife members 56 and 67 respectively. Adjacent facets 30 of the retrieving means 15 support similar pairs of spaced knife members and thus a recess 25.1 straddling a radius containing an intersection 73 of two adjacent facets is similarly defined by opposed knife portions of two adjacent knife members and not described in detail.

As seen in FIGS. 4 and 7, the knife portions 59 and 68 defining the recess 25 are spaced at a knife spacing 74 which is about 120 mm. and represents a maximum diameter of the trunk 26, shown in broken outline in FIG. 4, which can be accepted in the recess. A portion of the trunk having this maximum diameter is found typically about 3 to 5 meters from the uppermost portion of the tree and this determines the lowermost position of the apparatus 10 as it is lowered down the tree. Thus, the space between opposed knives of two adjacent knife members thus defines knife spacing of the recesses. A shallow V-shaped outer knife member 76 extends between the two opposed knife portions 59 and 68 to define a closed outer end of the recess 25. The knife member 76 is for cutting branches extending from the trunk adjacent the outer end of the recess.

As best seen in FIG. 5, the knife member 56 is inclined to the axis 17 of the device at an angle 72 which is about 55°, but this angle 72 can vary between 35° and 75° depending on the particular application. The knife edge 63 has two straight portions inclined to each other to slice branches obliquely. The branch bender 62 of the knife member 56 has an outer edge 75 which is similar in outline to the knife edges 63 and 64 of the knife portions 58 and 59, but is spaced so as to stand proud of a theoretical surface connecting the knife edges 63 and 64, the surface being shown in FIG. 6 in broken outline designated 79. The surface 79 has a generally flat rear portion and an angled front portion to conform generally to the edges 63 and 64. The branch bender is shown spaced, at a particular location, at a spacing 80 above the theoretical surface 79, but this spacing is not necessarily constant along the length of the branch bender, but is sufficient to contact the branch before cutting and may be typcially between 5 and 15 cm. The spacing 80 is dependent on spacing between the knife edges of the particular knife at the point of contact with the branch.

As seen in FIG. 16, the knife portions 59 and 68 are disposed so as to be parallel to each other and normally to the respective webs 57 and 70, whereas the remaining knife portions 58 and 69 of the knife members are inclined obliquely to the webs so as to be parallel to the knife portions located on opposite sides of their particular recesses. A portion of the trunk 26 is shown received in the recess 25 between the knife portions 59 and 68. The branch 27 contacts the outer edge 75 of the branch bender 62, and is shown in full outline having been deflected from a normal position 27.1, shown in broken outline, due to upward movement of the apparatus. It can be seen that a lower portion 81 of the branch is placed under tension due to the upward bending prior to contact with and severing by the adjacent knife portions 64.

It can be seen that the above described structure provides a simple separating means which uses easily fabricated knife members. Six left hand and six right hand knife members are manufactured and assembled as shown and joined at outer portions by outer knife portions. The knives which define the recesses are stationary and thus are non-rotationally mounted relative to the lower portion and to a central longitudinal axis of the apparatus. Stationary knives and relative accessories simplifies the construction and maintence of the apparatus when compared with a device with movable knives. Whilst the apparatus 10 shows equally sized knife spacing, in an alternative, not shown, differing knife spacing in the recesses could be used to accept different trunk diameters so that the pilot could select a particular recess to accept a particular size of trunk. Also, different arrangements of knives could be selected.

Referring to FIG. 4, the tree trunk 26 is shown in broken outline received in a particular recess 25, and is enclosed by four straight portions of knife edges over approximately 180° of its circumference. It can be seen that branches cut from the trunk fall outwardly into the enclosure 36 (FIGS. 1 and 2) for collection. It can also be seen that if the trunk is received for a particular pass in one recess only, respective branches on one-half the tree only are removed, thus having minimal effect on overall growth of the tree. Additional passes of the apparatus up the tree would remove additional branches.

As best seen in FIG. 4, radially inner end portions 65 and 65.1 of two diametrically opposed knife members on opposite sides of the axis 17 are spaced apart at a spacing 78 which thus represents a minimum transverse dimension of the upper periphery of the separating means. To provide sufficient clearance between the inner end portions relative to the tree and branches, preferably the spacing 78 is between three and five times the maximum thickness of the tree trunk to be accepted in the apparatus. As previously defined, the maximum thickness of the tree trunk at a lowermost position of the apparatus on the trunk is the knife spacing 74. It follows therefore that the minimum transverse dimension should be preferably between three and five times the knife spacing to permit the retrieving means to move laterally relative to the tree trunk.

FIGS. 8 and 9, with reference to FIG. 1

In these two figures, two cables 19 of the harness 18 are shown spaced at 180° for clarity, whereas, in fact, they are spaced at 120°. It can be seen that the holding means cooperates with the retrieving means 15 to form the enclosure 36 to collect the cone containing material 37 retrieved from the tree. Preferably, the cone containing material can be unloaded automatically from the enclosure 36 without requiring much effort on the part of an operator, not shown, on ground 86.

The unloading means includes three releasable latch means 88 which can releasably connect the upper portion 40 of the holding means 16 to intermediate portions of each of the three cables 19 of the harness 18. The cables 19 have lower ends secured to the lower portion 22 by cable anchors 89 on the brackets 51, FIG. 3. As also seen in FIG. 1, the latch means 88 includes a downwards facing hook 93 at three locations on the upper portion 40 of the holding means 16, and a respective eye 94 attached to each of the cables 19. A length of cable extending between the eye 94 and respective anchor 89 is termed unloading link means 96 and is considerably longer than height 90 of the holding means 16. In FIG. 1, the latch means are disengaged for cone collecting. FIG. 8 shows the latch means engaged with the retrieving means on the ground and the holding means raised by itself. FIG. 9 shows the final unloading position in which the length of the unloading link means 96 of each of the cables 19 permits a gap 91 having a vertical spacing 92 to be formed between the lower portion 41 of the holding means 16 and the lower portion 22 of the retrieving means 15. The link means 96 have similar lengths and support the means 15 spaced below the means 16 when discharging, and the gap 91 is generally equal around the apparatus. The gap 91 is sufficiently large to permit cone bearing material 37 to fall freely from the enclosure 36 when the links 89 support the structure as shown. In a normal collecting position, the latch means 88 are disengaged and the deadweight of the holding means 16 retains the lower portion 41 closely adjacent the portion 22 and thus effectively seals the bottom of the enclosure 36 to retain the cone containing material. The link means 96 thus extends between the holding means and retrieving means, and with the latch means 88 provides unloading means cooperating with the holding means and retrieving means to permit relative axial movement therebetween to produce a clearance to permit cone containing material to fall from the apparatus for emptying.

OPERATION

In operation, the apparatus 10 is suspended from the helicopter 12 by the harness 18, and the latch means 88 are disengaged so that the holding means 16 and retrieving means 15 are sealed adjacent lower edges thereof to provide the enclosure 36, termed a holding configuration. The device is lowered over the tree 13, as shown in FIG. 1, so that the trunk 26 and axis 17 generally coincide until the apparatus attains a desired lowermost position on the trunk. At this position the trunk has a diameter that is somewhat less than the knife spacing 74 of the separating means and the helicopter can swing the apparatus 10 generally laterally in a radial direction so that the trunk is accepted in one of the recesses 25. The helicopter then climbs slowly and maintains the trunk forced against the outer end of the recess, see FIG. 2. As the apparatus moves upwardly, branches are engaged by the branch bender, as seen in FIG. 6, and are then bent until contacted by and severed by the lateral knife portions. The lateral and outer knife portions engage branches over approximately 180° of the trunk circumference, and cut the branches so that they fall into the enclosure 36. As the helicopter climbs slowly generally vertically, the device 10 follows and sweeps axially upwardly of the tree, simultaneously removing branches from one side of the tree.

Branches from the opposite side of the same tree can also be collected by repositioning the helicopter so that the axis 17 of the apparatus and trunk become aligned. The helicopter then descends generally vertically until the desired location on the trunk is again attained. The helicopter then swings the apparatus laterally in a direction opposite to the first swing so that the trunk now engages another recess 25 on a generally opposite side of the apparatus. The helicopter then ascends generally vertically, simultaneously maintaining the trunk in the other recess so as to remove branches from the opposite side of the trunk. Cone bearing material then falls into the enclosure 36 on a side thereof generally diametrically opposite to that containing previously collected material cut when the tree trunk engaged the first recess.

Thus, it can be seen that a method of harvesting according to the invention is characterized by lowering the harvesting apparatus generally axially down the tree and shifting the apparatus generally laterally to engage a portion of the tree with one of the recesses. The apparatus is then moved generally axially upwardly to cause relative movement between the portions of the tree and the apparatus so that edges of the recess engage portions of the tree to remove cones therefrom, the edges of the recess having the knife portions. Prior to cutting a particular branch, the branch is bent upwardly by the branch bender so as to place a lower portion of the branch under tension, which portion is then contacted by the knife and then severed.

The helicopter can fly to other trees as desired and the trunks thereof are fitted in selected recesses so as to distribute the cone containing material as evenly as possible around the enclosure 36, thus approaching maximum load carrying capacity. In any event, for the sake of balance, it is preferable that the load of cone containing material collected in the enclosure 36 is generally evenly distributed.

When the apparatus 10 is to be unloaded from the holding configuration, it is set on the ground so that the link means 96 become slack enough to permit the hooks 93 on the holding means to engage the respective eyes 94 on the cables. The hooks are then engaged with the eyes either by an operator on the ground, remotely by the helicopter pilot by a control linkage of some kind, or by automatic engagement of a sensor, none of which are shown. When the hook and eye means are engaged, the helicopter pilot raises the holding means 16 by itself, initially without at first moving the retrieving means 15, as seen in FIG. 8. Clearly, the maximum distance the holding means can move away from the retrieving means is limited by lengths of cable between the eyes 94 on the cables and the anchors 89. When the means 96 tauten, the retrieving means is also raised so that the holding means are retrieving means now rise in unison. The gap 91 forms between the lower portions 22 and 41 to permit the cone containing material 37 to fall outwardly, as shown mainly in FIG. 9. The apparatus 10 is thus self-emptying to a large extent, although a few branches may remain caught but these could be easily removed by the operator.

When the apparatus is emptied, the helicopter lowers the apparatus so that the lower portion 22 of the retrieving means 15 first rests on the gound, which causes the tree unloading link means 96 between the eyes 94 and the anchors 89 to become slack. The helicopter continues to lower the holding means 16 until the holding means rests adjacent the lower portion 22 of retrieving means 15. The anchor 89 extends sufficiently to limit the lateral motion of the holding means as it descends, thus ensuring generally axial relative movement between the two means 15 and 16 to ensure sealing of the enclosure 36. The helicopter continues to lower the harness slowly to enable the hooks 93 to be disengaged from eyes 94 either by the operator on the ground, remotely by the helicopter pilot by a control linkage of some kind, or by automatic sensor, not shown, or by the weight of the eye itself. The helicopter then raises the harness 18 and when the slackness of the link means 96 is taken up, the retrieving means 15 also rises upwardly. Because the holding means 16 rests on the lower portion 22 of the retrieving means, the holding means also rises.

Any lateral movement of the holding means relative to the retrieving means is limited by cooperation between the anchor 90 and the cables 19. The helicopter continues to ascend and return once again to collect cones from trees.

In summary, the hook 93 and associated eye 94 for each cable 19 serve as unloading latch means cooperating with the link means 96 to permit the cone containing material to be removed from the apparatus as desired. It can be seen that unloading is characterized by relative axial movement between the holding means and retrieving means to produce a gap therebetween to permit the cone containing material to fall from the enclosure. During the loading operation and normal transportation of cone containing material, the holding means rests on the retrieving means to seal the enclosure 36. During the unloading operation, the upward motion of the helicopter lifts the holding means when the hooks on the holding means engage the eyes on the cable and the weight of the cone containing material and the retrieving means keeps the retrieving means on the ground until upward motion of the holding means takes up the cable slack. Then the holding means and retrieving means move up together, and the gap 91 is at its maximum, this facilitating unloading.

ALTERNATIVES AND EQUIVALENTS

The retrieving means is shown to be a six sided truncated pyramidal hollow body and clearly other structures could be devised, for example a truncated hollow conical structure could be substituted. Similarly, separating means using knife portions to provide knife edges in different configurations can be substituted for the knife members described, provided that the separating means has recesses to accept the trunk therein with sufficient clearance to permit lateral movement of the trunk within the retrieving means. Also, whilst branch benders cooperating with the knife means are preferable for cutting branches of many tree species, in some instances, it may be best to omit the branch benders and rely merely on cutting the branch without first tensioning a lower surface of the branch. Separating means other than knives can also be substituted, for example, rake means which rake cones from the branches, as will be described with reference to FIGS. 11 through 17.

In an alternative unloading means, not shown, hooks are carried on the cables and complementary eyes are mounted on the holding means. In another unloading means, not shown, one-way clutches are substituted for the hooks 93 on the holding means to allow each cable 19 to run axially downwardly past the upper portion 40, and to prevent the cables running upwardly. To unload the apparatus, the cable 19 is fed downwardly through the disengaged clutch to provide a slack unloading link portion having a length equal to height 91 plus spacing 92, see FIGS. 8 and 9. The cable 19 is then pulled upwardly and the clutch now engages the cable so that the holding means 16 only is raised. The retrieving means 15 remains stationary until the slack in the cable between the clutch and the cable anchor 89 is taken up, after which the retrieving means 15 is raised with the cables 19 to unload the cone bearing material as before. After the cone bearing material is unloaded, the helicopter lowers the cables 19 and the apparatus until the retrieving means 15 rests on the ground, after which the holding means rests on the retrieving means. When the cables 19 become slack, the one-way clutch is released by the pilot, or alternatively by slackness in the cable, or other means. When the slackness is taken up, both the retrieving means and holding means are raised simultaneously to permit resumption of collecting.

FIG. 10

A further alternative apparatus 100 has a retrieving means 101 and a holding means 102 which are generally similar to the means 15 and 16 of FIG. 1. The device includes an alternative harness 104 having three cables, two only being shown and designated 105. Again, the cables 105 are actually spaced at 120° apart, but are shown spaced at 180° for simplicity. The cables 105 have lower ends connected permanently to anchors adjacent a lower portion 107 of the retrieving means 101 to hold the means 101 level as previously described. The holding means 102 has guide means 108 adjacent a lower end 109, as shown in broken outling, the guide means accepting the cables threaded therethrough to permit sliding movement of the holding means along the cables. The holding means 102 has three relatively stiff legs 111, also spaced at 120 but drawn at 180° for simplicity, extending from the lower portion 109 and adapted to be set on the ground 86 to support the holding means as shown. The guide means 108 adjacent the lower portion 109 permit the cables 105 to run freely therethrough. Thus, when the leg means are lifted off the ground 86, weight of the holding means 102 maintains the holding means 102 in close contact with the lower end 107, thus forming a seal with the lower end 107. This forms an enclosure 114 defined by the means 101 and 102 to receive cone containing material in a manner similar to the enclosure 36 of FIG. 1, and is the usual holding configuration for collecting cone bearing material and transporting it from the tree, which configuration is not shown herein.

In operation, it can be seen that when the enclosure 114 is to be unloaded from the holding configuration, the apparatus 100 is lowered until the three legs 111 contact the ground 86, thus limiting further downwards movement of the holding means 102. Further lowering of the apparatus results in the retrieving means 101 only being lowered still further, whilst the holding means remains supported in the legs 111, the cables 105 running freely through the guide means 108. This relative axial movement between the means 101 and 102 produces a gap 116, shown partially open, between lower portions of the holding means and the retrieving means which permits the cone containing material, not shown, to fall to the ground. When the enclosure 114 has been emptied, the helicopter climbs and the cables 105 run freely through the guide means and draw the retrieving means upwardly against the holding means to seal the enclosure 114 once more.

It can be seen that the apparatus 100 has a self-unloading means and is a practical alternative to the previously described unloading means. This alternative structure essentially eliminates the need to engage the latch means 88 of FIGS. 8 and 9 for unloading the apparatus 10. This tends to increase safety of operation and also tends to decrease time required for unloading. Preferably, the alternative apparatus 100 should be used only where the ground 86 is generally level.

Figure 12:
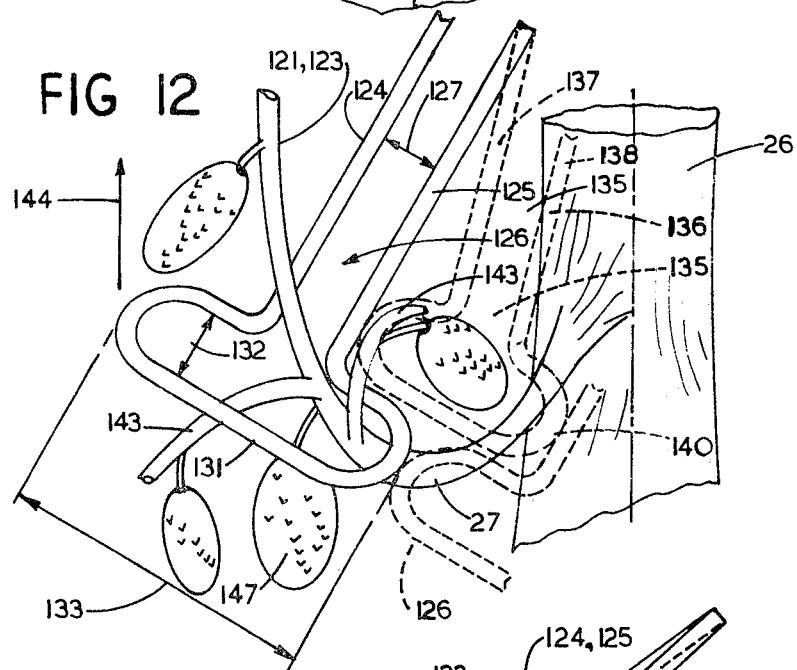
FIG. 12 is a simplified fragmented perspective of a rake of the separating means of FIG. 11 shown raking cones off a branch, with portions of adjacent rake shown in broken outline.
Figure 13:
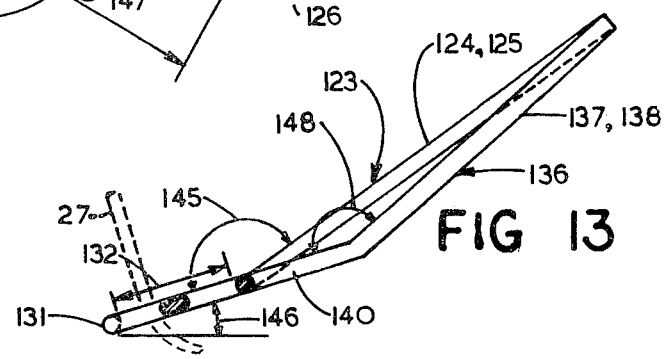
FIG. 13 is a simplified section generally on line 13—13 of FIG. 11.

FIGS. 11 through 13

A second embodiment 120 of a separating means is fitted adjacent the upper portion 21 of the retrieving means 18, and thus can be a direct substitution for the separating means 24 of FIGS. 1 through 9. The separating means 120 is particularly for use where maximum diameter of the cones is larger than maximum diameter of the branch on which the cones grow, and thus is fairly selective on separating cones by size, sometimes leaving smaller immature cones remaining on the branch. Tree species of this type include the amabilis fir, grand fir, alpine fir and many of the pines.

The separating means 120 is characterized by a plurality of rake members 121 which define branch receiving recesses 122. The rake members 121 include large rake members 123 providing large open T-shaped recesses 126. Referring to FIG. 12, the recesses 126 are defined by parallel side portions 124 and 125 which are spaced apart by a spacing 127 sufficient to accept freely the branch 27 therebetween. The rake member 123 has a straight, radially disposed entrance portion which terminates at a generally C-shaped closed end portion 131. Spacing 132 between the opposed portions of the C-shaped portion 131 is generally equal to the spacing 127. Also spacing 133 between opposite ends of the C-shaped portion 131 is about twice the spacing 127. Thus, it can be seen that area of the recess 126 is greatest at the closed end which provides additional space for sub-branches to expand into to reduce tight bunches of branches and cones that might otherwise occur. As seen in FIG. 13, the C-shaped portion 131 is inclined at an angle 145 (about 150°)to the side portions 124 and 125, and at an angle 146 (about 20°) to the horizontal. The angles are not very critical, e.g. they can be within 10° or 20° of those values, provided the branches tend to move into the C-shaped portion and are inclined generally normally thereto when under tension from the rake. One particular 60° sector of the separating means 120 has three large rake members 123 spaced along the upper portion 21, with generally similar corner rake members 134 at each corner. The rake members 134 are generally similar to the members 123, but are warped to conform to the separating means.

Referring to FIG. 11 and 12, the rake members of one sector also include four generally similar small rake members 136 intermixed with the three large rake members 123. The small rake members have small recesses 135 defined by parallel side portions 137 and 138 which extend from connections with adjacent large rake member side portions to a closed end portion 140. The portion 140 is generally C-shaped and has spaced apart side portions which provide an increase in area adjacent the closed end to receive sub-branches. Referring to FIG. 13, the portion 140 is coplanar with the portion 13, and is inclined to the side portions 137 and 138 at an angle 148 which is somewhat smaller than the angle 145 to accomodate the intersection of converging side portions of adjacent rake members. Referring to FIGS. 11 and 12, the closed end portions 129 of the large rake members 123 position the respective side portions apart sufficiently to fit the closed end portions 140 of the small rake members therebetween. The large and small rake members can be fabricated by bending steel rods and welding them together to form a grid as shown, or alternatively the means 120 can be stamped out from a sheet steel blank. It can be seen that the separating means resembles a truncated six-sided pyramid formed of a grid and that undesignated central axes of the recesses ar seen to intersect at a virtual vertex 142 of the truncated pyramid. Similarly to the previously described embodiment, structure defining the recesses is stationary, and thus is non-rotationally mounted relative to the lower portions and to a central longitudinal axis of the apparatus.

In operation, as best seen in FIG. 12, the branch 27 extending from the trunk 26 passes between the side portions 124 and 125. The branch 27 has sub-branches 143 which themselves bear cones 147, and tend to form bunches which are forced into the closed end portion 129. Upwards movement of the apparatus according to an arrow 144 bends the branch and sub-branches upwardly and, as the rake member 123 is pulled upwardly, the cones 147 extending from the sub-branches interfere with the side members of the recess and are broken off to fall into the enclosure, not shown, surrounding the retrieving means. Thus, it can be seen that the cones are effectively raked off the branches, and the branches are not deliberately severed as in the previous embodiment, although some sub-branches may be broken.

Thus, it can be seen that the separating means is adapted to pull cones from the branches, and edges of the recesses of the separating means serve as rake means. In effect, the rake means has at least one opening facing inwardly to accept at least one branch passing laterally therethrough. The remaining portion of the rake means has opposed edge portions spaced apart from each other to accept the branch therebetween. The edge portions of the rake member are spaced sufficiently closely from each other to trap a cone therebetween when the rake means is pulled upwardly which results in the branch being pulled through the rake means.

FIGS. 14 through 17

Figure 14:
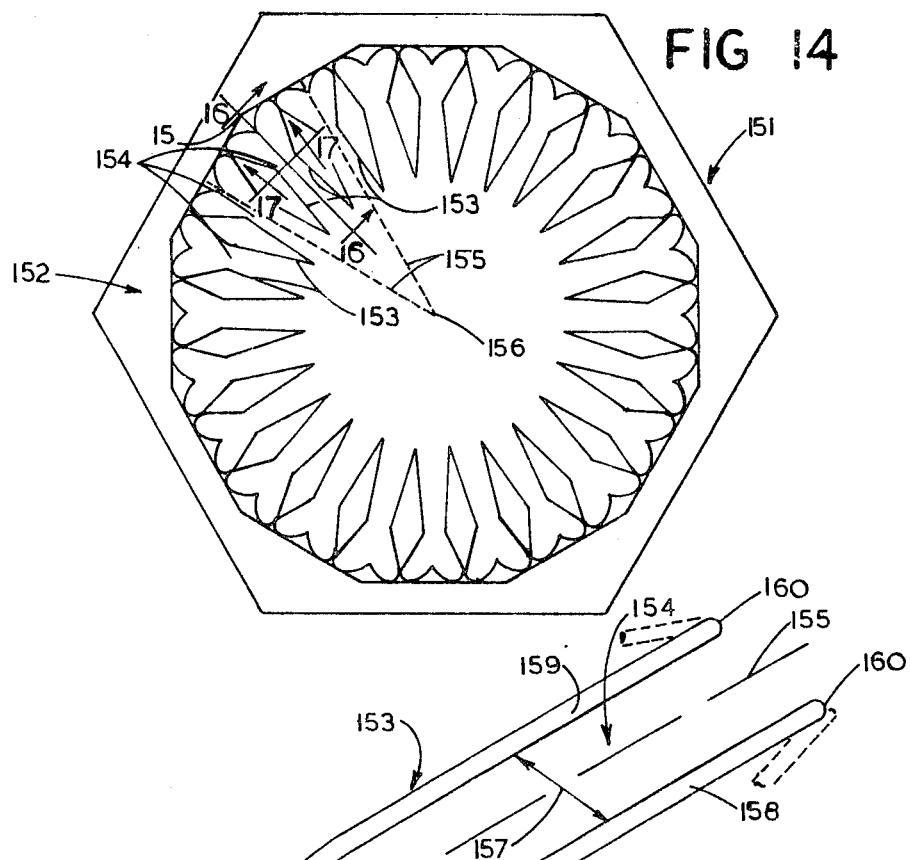
FIG. 14 is a simplified top plan of a further alternative separating means using alternative rakes.

An alternative separating means 151 functions equivalently to the separating means 120 of FIGS. 11 through 13 and thus also can be substituted for the separating means 24 of FIG. 1. The means 151 is also for use with the species of trees having cones which are generally considerably larger than branches bearing the cones. In FIG. 14, the separating means 151 has six generally equal sectors fitted on top of the truncated conical retrieving means 15, shown in FIGS. 1 and 2, and thus one sector 152 will be described. The sector 152 has four generally similar alternative rake members 153 which are positioned to provide a series of generally similar, inwardly facing recesses 154. The recesses have central axes 155 extending inwardly and converging to a virtual vertex 156 coincident with a central axis of the device, not shown.

Figure 15:
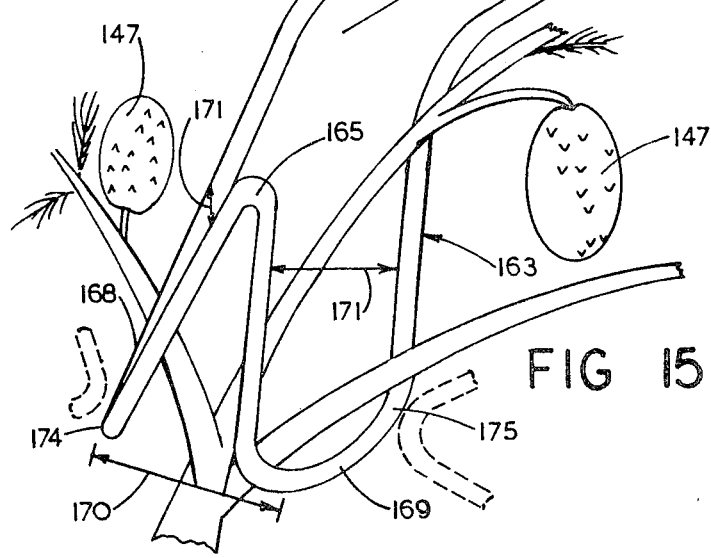
FIG. 15 is a simplified fragmented perspective of a portion of one of the alternative rakes of FIG. 14 shown cooperating with a cone bearing branch.

As seen in FIG. 15, one alternative rake member 153 has a pair of generally straight and parallel side portions 158 and 159 which are spaced apart at a spacing 157 to define a radially inner portion of the recess 154. The side portions extend generally radially outwardly from respective radial inner ends 160 and 161 to an inverted V-shaped closed end portion 163 formed from U-shaped extensions of the side portions which intersect at an apex 165 within a vertical plane, not shown, containing the axis 155. The end portion 163 has two generally similar U-shaped portions 168 and 169, lower ends of which are spaced apart at a spacing 170 which is about twice the spacing 157. Spacing 171 between opposed portions of the U-shaped portions 168 and 169 are each generaly equal to the spacing 157. It can be seen that there is thus an increase in cross sectional area in the recess 154 radially outwardly so as to provide additional space for branches and subbranches as the rake is drawn along the branch and sub-branches.

FIGS. 16 and 17 show particular portions of the rake member 153 which, as can be seen, can be formed from a bar. The side portions 158 and 159 are inclined at an angle 178 to the horizontal, and the U-shaped portion 168 is inclined to the vertical at an angle 179. The angle 178 is within a range of between 20° and 40° and thus less than 45° to allow the branch the slide radially inwardly from the closed end portion should the pilot decide to abort the operation, which might happen if branches jam in the recess and the helicopter becomes overloaded. The U-shaped portion 168 is somewhat less than vertical, and thus the angle 179 is typically within a range of between 10° and 25° to the vertical. It can be seen that the selection of the angles facilitates relatively easy withdrawal of a branch from the separating means should the pilot decide to abort the operation in an emergency. If the apparatus were dropped, the branch and sub-branches would be forced to move inwardly from the closed end along the recess and towards the central portion of the separating means.

Each rake member can be welded to adjacent rake members, shown in broken outline in FIG. 15 at the radially inner ends 160 and 161, and also at corners 174 and 175 of the V-shaped portions 168 and 169. The structure defining the recesses is again stationary relative to the lower portion and to the central longitudinal axis of the apparatus.

In operation, it can be seen that as the rake member 153 is drawn upwardly of the tree, branches received in the recess 154 pass radially outwardly towards the inverted V-shapoed portion 163 and divide at the apex 165 to form two bunches which are received in the U-shaped portions 168 and 169. This provides additional space for the branches which tends to reduce excessive tight bunching which might otherwise occure and cause excessive force on the separating means, thus possibly overloading the helicopter, or reduce a tendency of tearing of sub-branches with associated cones. Cones 147 raked from the branches fall into the enclosure, not shown, surrounding the separating means.

We claim:

1. Apparatus for harvesting cones from a tree, the apparatus having a retrieving means, a holding means, and an unloading means, the apparatus being characterized by:
    (a) the retrieving means having an upper portion having separating means to separate cone containing material from the tree resulting from relative movement between the retrieving means and the tree, the retrieving means having a guide means adapted to encircle the tree and to permit generally axial movement of the retrieving means relative to trunk of the tree,
    (b) the holding means cooperating with the retrieving means to provide a collector to collect the cone containing material retrieved from the tree,
    (c) the unloading means cooperating with the holding means and the retrieving means to permit relative axial movement therebetween to produce a clearance between the holding means and the retrieving means to permit the cone containing material to fall from the apparatus when desired.

2. An apparatus as claimed in claim 1 further characterized by:
    (a) the guide means of the retrieving means having a hollow tapered body with an outwardly and downwardly diverging side wall extending from the upper portion towards a lower portion thereof, (b) the holding means having a hollow body extending peripherally around the lower portion of the tapered body of the retrieving means so as to define an enclosure of the collector spaced around the retrieving means to hold the cone containing material.

3. An apparatus as claimed in claim 1 in which the unloading means is further characterized by:
(a) unloading link means extending between the holding means and the retrieving means so that upon actuation of the unloading means there is relative axial movement between the retrieving means and the holding means to empty the holding means as desired.

4. Apparatus as claimed in claim 2 further characterized by:
(a) the hollow body of the holding means being generally complementary to the lower portion of the retrieving means, and having open upper and lower portions, the lower portion of the holding means being adapted to enclose closely the lower portion of the retrieving means so as to form a seal therewith to prevent loss of the cone containing material from the collector, and the unloading means is characterized by:
(b) unloading link means extending between the holding means and the retrieving means to permit upwards axial movement of the holding means relative to the retrieving means to expose a gap between lower portions of the holding and retrieving means.

5. An apparatus as claimed in claim 1 further characterized by:
(a) the retrieving means having an upper periphery having a plurality of recesses to receive portions of the tree therein, the recesses being provided with the separating means to separate the cone containing material from the tree upon generally axial movement of the retrieving means along the trunk.

6. An apparatus as claimed in claim 5 in which the separating means is adapted to cut branches from the tree trunk and is further characterized by:
(a) the recesses being defined by a pair of generally parallel straight side edges provided with generally upwardly extending knives, the side edges being spaced apart at a knife spacing to accept maximum thickness of the tree trunk at a lowermost position of the apparatus on the trunk,
(b) the upper periphery having a minimum transverse dimension of at least three times the knife spacing to permit the retrieving means to move laterally relative to the tree trunk.

7. An apparatus as claimed in claim 6 further characterized by:
(a) a branch bender generally adjacent a knife and adapted to contact a branch to bend the branch prior to contact and severing by the respective knife.

8. An apparatus as claimed in claim 6 or 7 further characterized by:
(a) the recesses being disposed radially of the apparatus,
(b) the recesses further including closed outer ends also provided with upwardly extending knives.

9. Apparatus as claimed in claim 5 in which the separating means is adapted to rake cones from the branches and is further characterized by:
(a) the recesses having rake means, each rake means having an opening therein facing inwardly to accept a branch passing laterally therethrough, a remaining portion of the rake means having opposed edge portions spaced apart from each other to accept the branch therebetween and yet sufficiently closely from each other to trap a cone therebetween when the rake is pulled generally along the branch.

10. Apparatus for harvesting cones from a tree, the apparatus having a retrieving means and a holding means cooperating with the retrieving means so as to collect cone containing material retrieved from the tree, the retrieving means being characterized by:
(a) a lower portion having guide means adapted to encircle the tree and to permit generally axial movement of the retrieving means relative to trunk of the tree,
(b) an upper portion with an upper periphery having separating means to separate cone containing material from the tree resulting from relative movement between the retrieving means and the tree, the upper periphery having a plurality of recesses to receive portions of the tree therein, structure defining the recesses being stationary and non-rotationally mounted relative to the lower portion and to a central longitudinal axis of the apparatus, the recesses facing inwardly and having the separating means to separate the cone containing material from the tree upon generally axial movement of the retrieving means along the trunk with negligible rotational movement of the separating means,
(c) each recess being defined by a pair of generally parallel straight side edges provided with generally upwardly extending knives, the side edges being spaced apart at a knife spacing to accept maximum thickness of the tree trunk at a lowermost position of the apparatus on the trunk, the knives providing the separating means.

11. Apparatus as claimed in claim 10, further characterized by:
(a) the upper periphery having a minimum transverse dimension of at least three times the knife spacing to permit the retrieving means to move laterally relative to the tree trunk.

12. Apparatus as claimed in claim 11 further characterized by:
(a) a branch bender generally adjacent a knife and adapted to contact a branch to bend the branch prior to contact and severing by the respective knife.

13. Appartus as claimed in claim 12 further characterized by:
(a) the recesses being disposed radially of the apparatus,
(b) the recesses further including closed outer ends also provided with upwardly extending knives.

14. Apparatus as claimed in claim 1 in which the separating means is further characterized by:
(a) the recesses are defined by a plurality f generally radially disposed knife members having a generally flat web portion and a pair of knife portions extending upwardly from inclined side margins of the web portion to knife edges, space between opposed knife portions of two adjacent knife member defining the knife spacing of the recesses.

15. Apparatus as claimed in claim 12 further characterized by:

(a) the branch bender having an outer edge spaced so as to stand proud of a theoretical surface connecting upper edges of the knifes.

16. Apparatus for harvesting cones from a tree, the apparatus having a retrieving means and a holding means cooperating with the retrieving means so as to collect cone containing material retrieved fom the tree, the retrieving means being characterized by:
   (a) a lower portion having guide means adaped to encircle the tree and to permit generally axial movement of the retrieving means relative to trunk of the tree,
   (b) an upper portion with an upper periphery having separating means to separate cone containing material from the tree resulting from relative movement between the retrieving means and the tree, the upper periphery having a plurality of recesses to receive portions of the tree therein, structure defining the recesses being stationary and non-rotationally moundted relative to the lower portion and to a central longitudinal axis of the apparatus, the recesses facing inwardly and having the separating means to separate the cone containing material from the tree upon generally axial movement of the retrieving means along the trunk with negligible rotational movement of the separating means,
   (c) each recess having rake means, each means having an opening therein facing inwardly to accept a branch passing laterally therethrough, a remaining portion of the rake means having opposed edge portions spaced apart from each other to accept the branch therebetween, and yet spaced suffieicntly closely from each other to trap a cone therebetween the rake means is pulled generally along the branch, the rake means also having a closed end portion disposed radially outwardly from the opening and having an area greater than are adjacent the opening to provide space into which the branches can expand, edges of the recesses providing the separating means.

17. A method of harvesting cones from a tree using a cone harvesting apparatus having a retrieving means, the retrieving means having separating means with generally inwardly facing recesses to receive a portion of the tree enclosed by the retrieving means, the recesses having upwardly facing knives to provide the separating means, the method being characterized by:
   (a) lowering the cone harvesting apparatus generally axially down the tree,
   (b) shifting the apparatus generally laterally to engage a trunk of the tree within one of the recesses,
   (c) moving the apparatus generally axially upwardly along the trunk to cause relative movement between the portions of the tree and the apparatus so the the knives of the recess cut branches off the tree, thus removing cone containing material.

18. A method as claimed in claim 17 further characterized by:
   (a) prior to cutting a particular branch, bending that branch upwardly so as to place a lower portion of the branch under tension, which portion is then severed by a knife.

19. A method of harvesting cones from a tree using a cone harvesting apparatus having a retrieving means, the retrieving means having separating means with generally inwardly facing recesses to receive branches of the tree enclosed by the retrieving means, the method being characterized by:
   (a) lowering the cone harvesting apparatus generally axially down the tree,
   (b) shifting the apparatus generally laterally to engage at least one branch of the tree within one of the recesses,
   (c) moving the apparatus generally axially upwardly to cause relative movement between the branch of the tree and the apparatus so that edges of the recess engage the branch of the tree,
   (d) as the apparatus moves generally upwardly, permitting the branch engaged by the recess to move outwardly along the recess to a closed end portion having a width greater than width of the recess,
   (e) permitting sub-branches extending from the branch to expand into the recess to reduce excessive forces on the sub-branches as the apparatus moves up the tree,
   (f) pulling cones off the branches and sub-branches by raking with edges of the recess which serve as separating means.

* * * * *